(12) United States Patent
Yamaguchi et al.

(10) Patent No.: US 9,219,257 B2
(45) Date of Patent: Dec. 22, 2015

(54) NON-AQUEOUS ELECTROLYTE BATTERY WITH GAS ADSORBING CARBON MATERIAL

(75) Inventors: Akira Yamaguchi, Fukushima (JP); Yusuke Fujishige, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1623 days.

(21) Appl. No.: 10/758,764

(22) Filed: Jan. 16, 2004

(65) Prior Publication Data
US 2004/0185330 A1    Sep. 23, 2004

(30) Foreign Application Priority Data
Jan. 20, 2003    (JP) .................... P2003-011611

(51) Int. Cl.
| | | |
|---|---|---|
| *H01M 10/52* | (2006.01) | |
| *H01M 2/02* | (2006.01) | |
| *H01M 4/62* | (2006.01) | |
| *H01M 10/0525* | (2010.01) | |
| *H01M 10/0565* | (2010.01) | |
| *H01M 4/1391* | (2010.01) | |
| *H01M 4/1393* | (2010.01) | |
| *H01M 4/485* | (2010.01) | |
| *H01M 4/525* | (2010.01) | |
| *H01M 4/587* | (2010.01) | |
| *H01M 4/60* | (2006.01) | |
| *H01M 4/02* | (2006.01) | |

(52) U.S. Cl.
CPC ............ *H01M 2/0275* (2013.01); *H01M 4/625* (2013.01); *H01M 10/0525* (2013.01); *H01M 10/0565* (2013.01); *H01M 10/52* (2013.01); *H01M 2/0287* (2013.01); *H01M 4/1391* (2013.01); *H01M 4/1393* (2013.01); *H01M 4/485* (2013.01); *H01M 4/525* (2013.01); *H01M 4/587* (2013.01); *H01M 4/60* (2013.01); *H01M 2004/021* (2013.01); *H01M 2004/027* (2013.01); *H01M 2004/028* (2013.01); *H01M 2300/0082* (2013.01); *H01M 2300/0085* (2013.01); *Y02E 60/122* (2013.01)

(58) Field of Classification Search
USPC .............................. 429/122, 218, 57, 59, 163
See application file for complete search history.

(56) References Cited

U.S. PATENT DOCUMENTS

| | | | | |
|---|---|---|---|---|
| 5,542,163 | A | * | 8/1996 | Chang .................................. 29/2 |
| 5,807,645 | A | * | 9/1998 | Takeuchi et al. ............ 429/231.4 |
| 7,838,150 | B2 | * | 11/2010 | Kinoshita et al. ........... 429/231.8 |
| 2003/0049519 | A1 | * | 3/2003 | Ishida et al. ..................... 429/57 |

FOREIGN PATENT DOCUMENTS

| | | | | |
|---|---|---|---|---|
| EP | 1063713 | * | 12/2000 | .............. H01M 2/02 |
| JP | 08083596 | A * | 3/1996 | |
| JP | 09-035718 | | 2/1997 | |
| JP | 09-063648 | | 3/1997 | |
| JP | 09-092265 | | 4/1997 | |
| JP | 11-154515 | | 6/1999 | |

(Continued)

*Primary Examiner* — Tracy Dove
(74) *Attorney, Agent, or Firm* — Dentons US LLP (57) ABSTRACT

Disclosed is a non-aqueous electrolyte battery for suppressing the swell of a film-shaped exterior material. A gas adsorbing carbon material added to an anode mixture layer 9 of an anode 4 and/or to a cathode mixture layer 13 of a cathode 5 adsorbs a gas generated in the battery to suppress the gas storage in the battery, so that it is possible to suppress the swell of a film-shaped exterior material 3 caused by the storage of the gas generated within the battery.

13 Claims, 3 Drawing Sheets

(56) References Cited

FOREIGN PATENT DOCUMENTS

| | | |
|---|---|---|
| JP | 11-224670 | 8/1999 |
| JP | 2001-155790 | 6/2001 |
| JP | 2002-298844 | 10/2002 |
| WO | WO 02/41420 * | 5/2002 |

* cited by examiner

NON-AQUEOUS ELECTROLYTE BATTERY WITH GAS ADSORBING CARBON MATERIAL

TECHNICAL FIELD

This invention relates to a non-aqueous electrolyte battery having an exterior material for sealing a cathode, an anode and a non-aqueous electrolyte together, in which battery characteristics are appreciably improved by suppressing deformation of the exterior material.

This application claims priority of Japanese Patent Application No. 2003-011611, filed in Japan on Jan. 20, 2003, the entirety of which is incorporated by reference herein.

BACKGROUND ART

Recently, a lightweight secondary battery of a high energy density is being developed as a power supply for portable electronic equipment, such as a notebook portable computer, an information terminal device (Personal Digital Assistant or PDA), a mobile phone, or a video tape recorder (VTR) with a built-in camera. As the secondary battery having this high energy density, there is known a lithium ion secondary battery, having an energy density higher than that of e.g. a lead or nickel/cadmium battery, and in which the charging/discharging reaction of the battery proceeds by allowing lithium ions to be moved between the cathode and the anode.

This lithium ion secondary battery can be further reduced in thickness and weight by employing a film-shaped exterior material in place of e.g. a metal vessel. Specifically, a hermetically sealed structure can readily be obtained in the lithium ion secondary battery by employing, as the film-shaped exterior material, a laminate film composed of a heat-sealable film of a high molecular material, and a metal foil, layered together, and by heat-sealing the laminate film having enclosed therein e.g. the electrodes (see for example the cited document 1).
[Cited Document 1]
Japanese Patent Application Laid-Open No. H8-83596

However, the laminate film used as the exterior material in the above-described lithium ion secondary battery is low in tenacity as compared to other exterior materials, such as metal vessel. Thus, in case the lithium ion secondary battery is over-charged or over-discharged by mistaken operations on the electronic equipment, or is left in a car during summer at a high temperature, the non-aqueous electrolytic solution in the battery is decomposed due to heat, etc., applied to it, to generate e.g. carbonic gas to deform the film-shaped exterior material. The gas evolved in the battery tends to cause the film-shaped exterior material to be expanded like a balloon.

DISCLOSURE OF THE INVENTION

In view of the above depicted status of the art, it is an object of the present invention to provide a non-aqueous electrolyte battery in which the exterior material may be prevented from being deformed by storage in the battery of a gas evolved when the battery is left in a high-temperature condition.

In one aspect, the present invention provides a non-aqueous electrolyte battery comprising a battery device including an anode having an anode mixture containing an anode active material, and a cathode having a cathode mixture containing a cathode active material, the anode and the cathode being layered together via a separator, a solid electrolyte including a polymer material and an electrolyte salt contained therein, and a film-shaped exterior material housing therein the battery device and the solid electrolyte, wherein a gas adsorbing carbon material formed of a carbonaceous material having a specific surface not less than 30 $m^2/g$ is added to the anode mixture and/or to the cathode mixture for adsorbing a gas evolved within the battery.

With this non-aqueous electrolyte battery, in which the gas adsorbent carbon material, added to the anode mixture and/or the cathode mixture, adsorbs the gas generated in the battery to prevent the gas from being accumulated in the battery, the film-shaped exterior material may be prohibited from being deformed by the gas generated within the battery.

In another aspect, the present invention provides a non-aqueous electrolyte battery comprising a battery device including an anode having an anode mixture layer containing an anode active material on an anode current collector, the anode having an exposed anode current collector portion exposing the anode current collector, and a cathode including a cathode mixture layer containing a cathode active material on a cathode current collector, the cathode having an exposed cathode current collector portion exposing the cathode current collector, the anode and the cathode being layered together via a separator, a solid electrolyte including a polymer material and an electrolyte salt contained therein, a gas adsorbing carbon layer containing a gas adsorbing carbon material with specific surface not less than 30 $m^2/g$, for adsorbing a gas evolved within the battery, and a film-shaped exterior material housing therein the battery device, the solid electrolyte and the gas adsorbing carbon layer. The gas adsorbing carbon layer is provided to the exposed anode current collector portion and/or to the exposed cathode current collector portion.

With this non-aqueous electrolyte battery, in which the gas adsorbent carbon material, contained in the gas adsorbing carbon layer, provided to the exposed anode current collector portion and/or the exposed anode current collector portion, adsorbs the gas generated in the battery to prevent the gas from being accumulated in the battery, the film-shaped exterior material may be prohibited from being deformed by the gas generated within the battery.

In yet another aspect, the present invention provides a non-aqueous electrolyte battery comprising a battery device including an anode having an anode mixture containing an anode active material, and a cathode having a cathode mixture containing a cathode active material, the anode and the cathode being layered together via a separator, a solid electrolyte including a polymer material and an electrolyte salt contained therein, a gas adsorbing carbon layer composed of a carbonaceous material with a specific surface not less than 30 $m^2/g$ for adsorbing a gas evolved in the battery, and a film-shaped exterior material housing therein the battery device, the non-aqueous electrolyte and the gas adsorbing carbon layer. The gas adsorbing carbon layer is provided to an inner surface of the film-shaped exterior material facing the battery device.

With this non-aqueous electrolyte battery, in which the gas adsorbent carbon material, contained in the gas adsorbing carbon layer provided to the inner surface, adsorbs the gas generated in the battery to prevent the gas from being accumulated in the battery, the film-shaped exterior material may be prohibited from being deformed by the gas generated within the battery.

With the non-aqueous electrolyte battery, according to the present invention, the gas adsorbent carbon material, added to or contained in the electrode mixture layer, or the gas adsorbent carbon layer provided to the electrodes or the exterior material, adsorbs the gas generated in the battery to suppress gas storage in the battery. Consequently, with the present non-aqueous electrolyte battery, it is possible to prevent the film-shaped exterior material from becoming expanded like a balloon as a result of the storage of the gas generated in the battery.

BEST MODE FOR CARRYING OUT THE INVENTION

Figure 1:
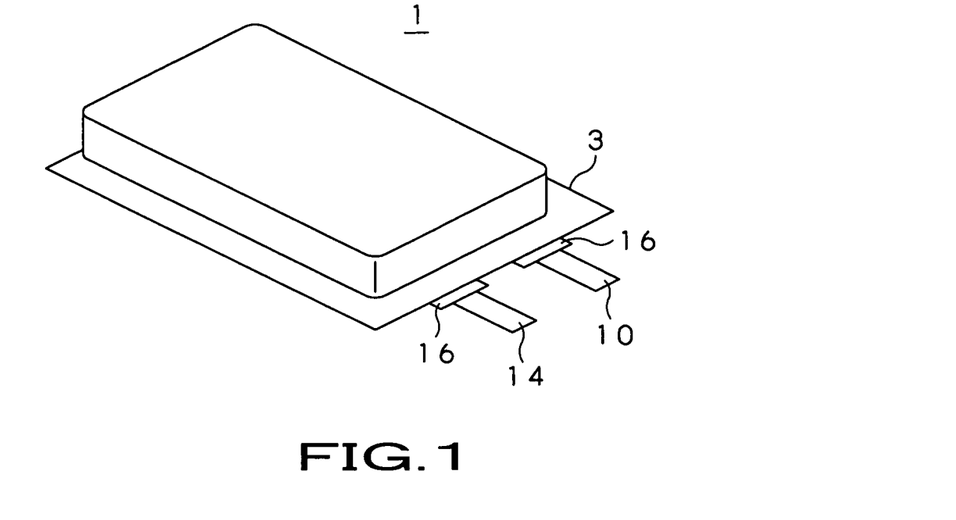
FIG. 1 is a perspective view showing a lithium ion secondary battery according to the present invention.
Figure 2:
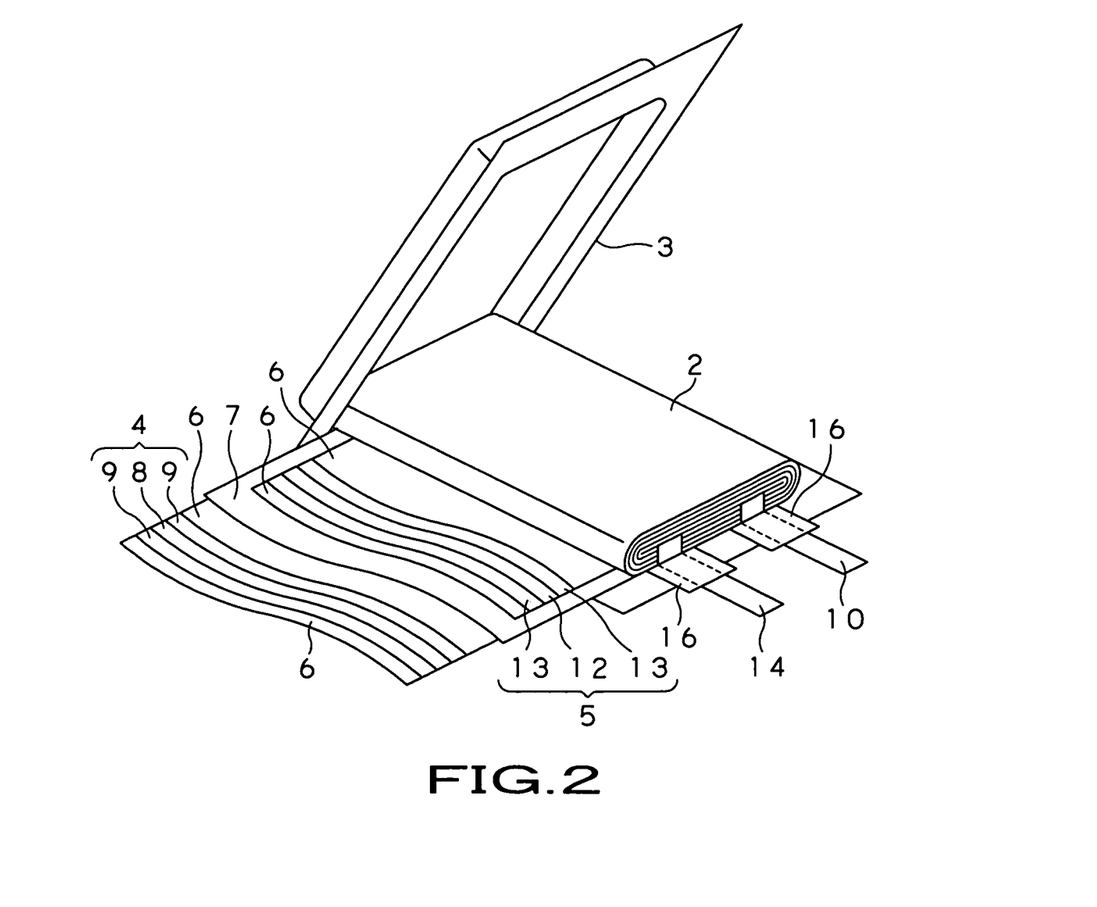
FIG. 2 is an exploded perspective view showing an inner structure of the lithium ion secondary battery.

Referring to the drawings, a non-aqueous electrolyte battery according to the present invention is explained by taking a lithium ion secondary battery, shown in FIGS. 1 and 2, as an example. The lithium ion secondary battery may simply be referred to as a battery hereinafter. Meanwhile, the battery 1 is mounted e.g. on a battery pack provided to electronic equipment, such as a mobile phone, and operates as power supply for providing power of a preset voltage to the electronic equipment in stability. This battery 1 is a so-called polymer battery including a battery device 2, as a power generating element, and a film-shaped exterior material 3 for enclosing the battery device 2.

The battery device 2 operates as a power generating device by coiling a strip-shaped anode 4 and a strip-shaped cathode 5 along the longitudinal direction thereof as a solid electrolyte 6, containing an organic high polymer material and an electrolyte salt, and a separator 7 which are interposed between the anode and the cathode.

Figure 3:
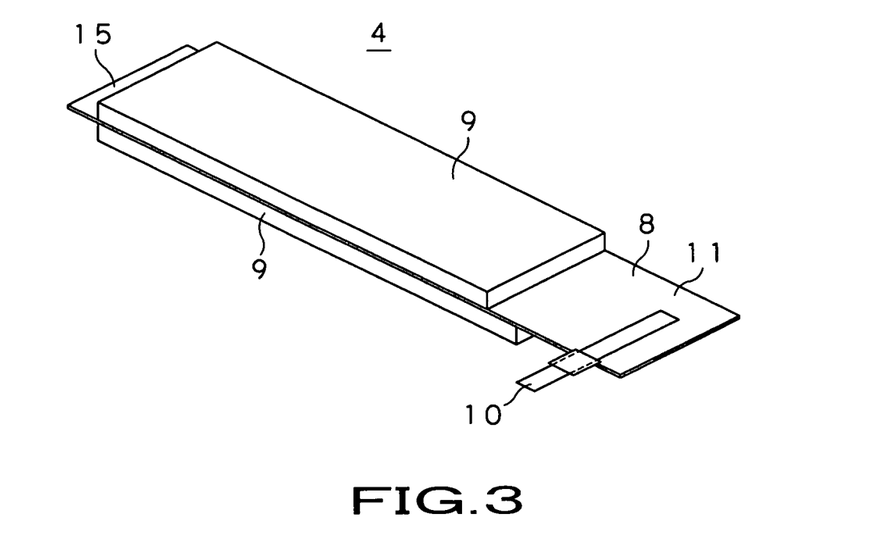
FIG. 3 is a perspective view showing an anode provided to the lithium ion secondary battery.

Referring to FIG. 3, the anode 4 is of such a structure in which a layer of an anode mixture 9, admixed with a gas adsorbing carbon material, is formed under compression on each major surface of an anode current collector 8, by coating an anode mixture coating solution, composed of an anode active material, a gas adsorbing carbon material for adsorbing the gas evolved in the battery, and a binder, on each major surface of the anode current collector 8, drying and pressurizing the so coated solution. An anode lead terminal 10 is connected to the anode 4 at a preset position of the anode current collector 8. This anode lead terminal 10 is e.g. a strip-shaped metal piece, formed of an electrically conductive material, such as copper or nickel.

In both longitudinal ends of the anode 4, there are provided exposed anode collector portions 11 where each major surface of the anode current collector 8 is exposed without forming the anode mixture layer 9 thereon, as sites for connection to e.g. the anode lead terminal 10.

As the anode active material, a material having a potential of 2V or less against lithium and which is capable of doping/undoping lithium, is used. For example, a carbonaceous material, capable of doping/undoping lithium, lithium alloys or lithium ions, is used.

The material capable of doping/undoping lithium ions may be exemplified by, for example, non-graphitizable carbon, graphitizable carbon, graphite, pyrocarbons, cokes, vitreous carbons, sintered polymer compounds, carbon fibers or activated charcoal. Examples of the cokes include pitch coke, needle coke and petroleum coke. The sintered polymer compounds mean high molecular compounds, such as phenol resin or furan resin, carbonized on firing at an appropriate temperature. There are those sintered polymer compounds which may be classified into non-graphitizable carbon and graphitizable carbon.

Of these carbonaceous materials, the graphite has a large electro-chemical equivalent and gives a high energy density. The graphite may be produced by firing a starting material, such as coal-based coke, at a firing temperature not lower than 2000° C., then cooling the material, and by subsequently pulverizing and classifying the resulting product.

The graphite having a true density not lower than 2.10 $g/cm^3$ is optimum in e.g. charging/discharging cyclic characteristics. For achieving this true density, it is necessary that the C-axis crystallite thickness of the (002) plane is not less than 14.0 mm. It is more desirable that the spacing of the (002) plane is less than 0.340 nm, its range being not less than 0.355 nm and not larger than 0.337 nm. Moreover, if, with the graphite, the average shape parameter is 125 or less and the specific surface area as measured by the BET method is 9 $m^2/g$ or less, with the true density and the bulk density as specified above, the amount of submicron secondary particles, affixed to the particles, is small, thus leading to more favorable effects on charging/discharging cyclic characteristics.

With the graphite, more favorable effects on safety and reliability of the battery, such as prevention of inner shorting, may be accomplished when the pulverization and classification are carried out so that, with particle size distribution by the laser diffraction method, the cumulative 10% particle size is not less than 3 μm, cumulative 50% particle size is not less than 10 μm and the cumulative 90% particle size is not less than 50 μm. If, with the graphite, the destruction strength of the particle is not lower than 6 $kgf/mm^2$ and the bulk density is not less than 0.4 $g/cm^3$, there are produced more voids, to be impregnated with e.g. a solid electrolyte 6, as later explained, in the mixture layer 9 of the anode 4, thereby improving battery characteristics.

As the anode active material, metal compounds, capable of doping/undoping lithium, for example, may be used, in addition to the above-described carbonaceous material. As these metal compounds, oxides capable of doping/undoping lithium at a relatively base potential, such as iron oxide, ruthenium oxide, molybdenum oxide, tungsten oxide, titanium oxide or tin oxide, and nitrides obtained on substituting nitrogen for oxygen in these oxides, may be used.

To the anode mixture layer 9 is added a gas adsorbing carbon material, capable of adsorbing a gas evolved in the battery. The gas adsorbing carbon material is, for example, a carbonaceous material having a specific surface not less than 30 $m^2/g$ as measured by the BET method, and may be exemplified by carbon black, such as acetylene black or KETJEN-BLACK™, and activated carbon, having a specific surface generally on the order of 700 to 1600 $m^2/g$. These materials may be used either singly or in combination.

In the anode 4, binders used for an anode mixture of the non-aqueous electrolyte battery, such as polyvinylidene fluoride or polytetrafluoroethylene, may be used as a binder for the anode mixture layer 9. In the anode 4, foil-shaped metal or expanded metal, formed of electrically conductive metal, such as copper, is used as the anode current collector 8.

If, in the anode 4 of this structure, over-charging or over-discharging has occurred as a result of the mistaken operation of e.g. the electronic equipment, or as a result that the electronic equipment is left in a car in summer and caused to be in a high-temperature condition, such that the non-aqueous electrolyte 6, for example, is decomposed under heating to yield e.g. carbonic gas, the gas adsorbing carbon material, added to the anode mixture layer 9, is adsorbed to the so yielded carbonic gas to prevent the gas from being stored in the battery.

With the anode 4, since the gas adsorbing carbon material, added to the anode mixture layer 9, is the electrically conductive carbonaceous material, storage of the gas in the battery may be suppressed without lowering the electrical conductivity of the anode mixture layer 9. In particular, if the carbon black, exhibiting high electrical conductivity, is used as the gas adsorbing carbon material, the gas adsorbing carbon material acts for improving the electrical conductivity of the anode mixture layer 9, thus leading to improved battery characteristics.

The gas adsorbing carbon material, added to the anode mixture layer 9, has a specific surface not less than 30 $m^2/g$, as measured by the BET method. If the specific surface of the gas adsorbing carbon material, which is an area for gas adsorption in contact with the gas evolved in the battery, is less than 30 $m^2/g$, the area for gas adsorption is diminished and hence the amount of the gas in the battery adsorbed by the gas adsorbing carbon material decreases. With the gas adsorbing carbon material, with the specific surface not less than 30 $m^2/g$, the area contacting with the gas evolved in the battery to adsorb the gas is increased, thereby increasing the amount of the adsorbed gas in the battery.

In the anode 4, the gas adsorbing carbon material is added in an amount in a range from 0.1 wt % to 6.0 wt % based on the total weight of the anode mixture layer 9.

If the amount of addition of the gas adsorbing carbon material to the total weight of the anode mixture layer 9 is less than 0.1 wt %, the gas adsorbing carbon material admixed to the anode mixture layer 9 is only small, so that the amount of the gas evolved in the battery which is deposited to the gas adsorbing carbon material is also reduced, such that the gas is stored within the battery. If the amount of addition of the gas adsorbing carbon material to the anode mixture layer 9 is larger than 6 wt %, there is a risk that the excess gas adsorbing carbon material added to the anode mixture layer 9 decomposes the solid electrolyte 6, as later explained, thereby lowering the battery characteristics.

Thus, by adding the gas adsorbing carbon material in an amount in a range from 0.1 wt % to 6.0 wt % to the anode mixture layer 9, it is possible to suppress the storage of the gas in the battery and to prevent the battery characteristics from being lowered.

Figure 4:
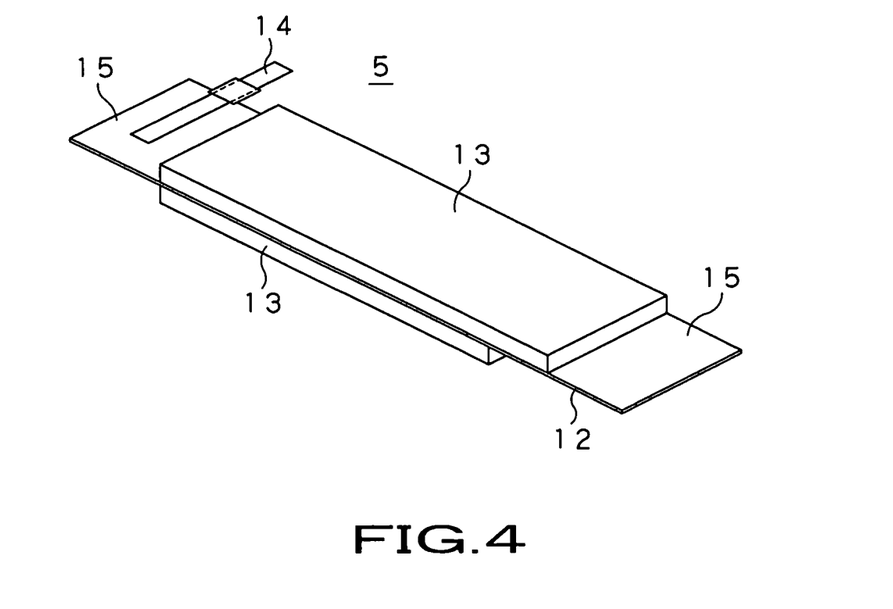
FIG. 4 is a perspective view showing a cathode provided to the lithium ion secondary battery.

Referring to FIG. 4, the cathode 5 is of such a structure in which a layer of a cathode mixture 13 is formed under compression on each major surface of an cathode current collector 12, by coating a cathode mixture coating solution, composed of a cathode active material, an electrically conductive material, and a binder, on each major surface of the cathode current collector 12, drying and pressurizing the so coated solution. A cathode lead terminal 14 is connected to the cathode 5 at a preset position of the cathode current collector 12. This cathode lead terminal 14 is e.g. a strip-shaped metal piece, formed of an electrically conductive material, such as aluminum. In this cathode 5, a gas adsorbing carbon material, composed of a carbonaceous material having a specific surface of not less than 30 $m^2/g$, as measured by the BET method, may be admixed to the cathode mixture 13, as in the case of the anode 4 described above.

In both longitudinal ends of the cathode 5, there are provided exposed cathode collector portions 15 where each major surface of a cathode current collector 12 is exposed without forming the cathode mixture layer 13 thereon, as sites for connection to the cathode lead terminal 14.

For the cathode active material, a lithium compound oxide, represented by the chemical formula of, for example, $Li_xMO_2$, in which the battery capacity may be set to a larger value, is used. In the chemical formula, M is one or more transition metal, such as Co, Ni, Mn, Fe, Al, V or Ti, and the valence x of Li is not less than 0.5 and not larger than 1.10. The transition metal M, forming this lithium compound oxide, is preferably Co, Ni or Mn. Specified examples of this lithium compound oxide include a lithium cobalt compound oxide, a lithium nickel compound oxide, a lithium nickel cobalt compound oxide and a spinel lithium manganese oxide, represented by the chemical formula of $Li_xCoO_2$, $Li_xNiO_2$ or $Li_xNi_yCo_{1-y}O_2$, where $0<y<1$, and $LiMn_2O_4$. The cathode active material may be exemplified by inexpensive compounds having an olivinic structure and a stable crystalline structure, and which is represented by a chemical formula of, for example, $Li_xM_yPO_4$, where M is one or more of Fe, Mn, Cr, Co, Cu, Ni, V, Mo, Ti, Zn, Al, Ga, Mg, B, Nb, SnCa and Sr, the valence x of Li is such that $0.5≤x≤1.1$ and the valence y of M is such that $0.5≤y≤1$. Specifically, $LiFePO_4$, for example, is used. Moreover, as the cathode active material, metal sulfides or oxides, such as $TiS_2$, $MoS_2$, $NbSe_2$ or $V_2O_5$, may also be used.

In the cathode 5, a binder such as polyvinylidene fluoride or polytetrafluoroethylene, used for the cathode mixture of the non-aqueous electrolyte battery, may be used as a binder for the cathode mixture layer 13. The electrically conductive material, contained in the cathode mixture layer 13, may be exemplified by a carbonaceous material, such as graphite or carbon black. In the cathode 5, foil-shaped metal or expanded metal, formed of electrically conductive metal, such as aluminum, is used as the cathode current collector 9.

In the cathode 5 of the above structure, a gas adsorbing carbon material, in addition to the cathode active material, electrically conductive material, and the binder, may be added to the cathode mixture layer 13. If, in the cathode 5, carbon black, having superior electrical conductivity, is used as the gas adsorbing carbon material, a gas adsorbing carbon material may be added as an electrical conductive material to the cathode mixture layer 13.

Thus, in the cathode 5, if a gas has been evolved in the inside of the battery which has fallen into disorder, the gas within the battery can be properly adsorbed by the gas adsorbing carbon material admixed to the cathode mixture layer 13, as in the anode 4. That is, with the present cathode 5, the operation and effect comparable to those with the anode 4 can be accomplished by adding the gas adsorbing carbon material to the cathode mixture layer 13.

If activated carbon, having a relatively low electrical conductivity, is added to the cathode 5 as a gas adsorbing carbon material, in addition to the cathode active material and the electrically conductive material, not less than 0.2 wt % and not more than 8 wt % of activated carbon is added with respect to the total weight of the cathode mixture layer 13.

In case the amount of addition of activated carbon is less than 0.2 wt % based on the weight of the cathode mixture layer 13, the amount of activated carbon added to the cathode mixture layer 13 is only small, so that the amount of the gas evolved in the battery which is deposited to the gas adsorbing carbon material is also reduced, such that the gas is stored within the battery. If the amount of addition of the gas adsorbing carbon material to the cathode mixture layer 13 is larger than 8 wt %, there is a risk that the amount of activated carbon added to the cathode mixture layer 13 is larger, while the proportion of the cathode active material contained in the cathode mixture layer 13 is small, thus lowering the battery capacity.

Thus, in the cathode 5, if the activated carbon is added, in addition to the cathode active material and the electrically conductive material, as the gas adsorbing carbon material, and the activated carbon is added in an amount of not less than 0.2 wt % and not more than 8 wt % to the cathode mixture layer 13, it is possible to prevent the gas from being stored in the battery and to prevent the battery capacity from being lowered.

Moreover, if carbon black, having superior electrical conductivity, is added to the cathode mixture layer 13 of the cathode 5 as the electrically conductive material and the gas adsorbing carbon material, without employing the conventional electrically conductive material, the carbon black is added in an amount of not less than 0.2 wt % and less than 4 wt %, preferably in an amount of not less than 2 wt % and less than 4 wt %, based on the total weight of the cathode mixture layer 13.

In case the amount of addition of carbon black is less than 0.2 wt % based on the weight of the cathode mixture layer 13, the amount of carbon black added to the cathode mixture layer 13 is only small, so that the amount of the gas evolved in the battery and which is deposited to the gas adsorbing carbon material is also reduced, while the electrical conductivity of the cathode mixture layer 13 is lowered to lower the battery characteristics. If the amount of addition of the carbon black is not less than 4 wt %, there is a risk that the electrical conductivity of the cathode mixture layer 13 becomes excessive on account of the excess carbon black added to the cathode mixture layer 13, such that the battery temperature becomes excessively high in case of over-charging, as an example, to render it difficult to achieve superior battery safety.

Thus, in case carbon black, for example, is added to the cathode mixture layer 13 as the gas adsorbing carbon material also serving as the electrically conductive material, the carbon black is added in an amount of not less than 0.2 wt % and less than 4 wt %, to the cathode mixture layer 13, whereby it is possible to suppress gas storage in the battery and to achieve superior characteristics and safety of the battery. In particular, if carbon black is added in an amount of not less than 2 wt % and less than 4 wt % to the cathode mixture layer 13, as the gas adsorbing carbon material, simultaneously usable as the electrically conductive material, the cathode mixture layer 13 with optimum electrical conductivity may be achieved, thus accomplishing further superior battery characteristics.

The solid electrolyte 6 serves for transferring e.g. lithium ions between the anode 4 and the cathode 5. Thus, an organic solid electrolyte having lithium ion conductivity is used as the solid electrolyte 6. As this organic solid electrolyte, a high polymer solid electrolyte, composed of an electrolyte salt and a polymer material containing the electrolyte salt, or a gel electrolyte, composed of a non-aqueous electrolytic solution contained in a high molecular matrix, may be used. The solid electrolyte 6 is formed as an electrolyte layer by coating the electrolytic solution containing the organic solid electrolyte on the surfaces of the anode 4 and the cathode 5 and solidifying the resulting product.

In the solid electrolyte 6, the electrolyte salt, routinely used for the non-aqueous electrolyte battery, may be used. Examples of the electrolyte salt may include $LiPF_6$, $LiBF_4$, $LiAsF_6$, $LiClO_4$, $LiB(C_6H_5)_4$, $CH_3SO_3Li$, $CF_3SO_3Li$, $LiC_4F_9SO_3$, $LiN(SO_2CF_3)_2$, $LiN(SO_2C_2F_5)_2$, $LiC(SO_2CF_3)_3$, $LiAlCl_4$, $LiSiF_6$, $LiCl$ and $LiBr$, which may be used either singly or in combination. In particular, $LiPF_6$ and $LiBF_4$, superior in oxidation stability, are used as the electrolyte salt.

When the solid electrolyte 6 is the high molecular solid electrolyte, an etheric high molecular material, such as poly (ethylelene) oxide or a cross-linked derivative thereof, a poly (methacrylate) ester based high molecular material or an acrylate high molecular material, may be used either singly or as a copolymer in a molecule or a mixture.

When the solid electrolyte 6 is the gel electrolyte, a solvent with a relatively high dielectric constant is used as a non-aqueous solvent in which the aforementioned electrolyte salt is dissolved to from a non-aqueous electrolyte solution. In this case, the non-aqueous electrolyte solution operates as a plasticizer. Specifically, the non-aqueous solvent may be enumerated by propylene carbonate, ethylene carbonate, vinylene carbonate, γ-butyrolactone, diethyl carbonate, dimethyl carbonate, 1,2-dimethoxyethane, 1,2-diethoxyethane, tetrahydrofuran, 2-methyl tetrahydrofuran, 1,3-dioxolane, 4-methyl-1,3-dioxolane, diethylether, sulforane, methyl sulforane, acetonitrile, propionitrile, an ester acetate, an ester lactate and an ester propionate. These may be used either alone or in combination.

As the solid electrolyte 6, any of a large variety of high molecular materials, for containing the non-aqueous liquid electrolyte of the gel electrolyte, capable of absorbing and gelating the non-aqueous liquid electrolyte, may be used. Specified examples of the solid electrolyte may include a fluorine-based high molecular material, such as poly(vinylidene) fluoride or poly(vinylidene) fluoride-co-hexafluoropropylene, an etheric high molecular material, such as poly (ethylene) oxide or cross-linked derivatives thereof, and poly (acrylonitrile). These may be used either alone or admixed together in combination.

The separator 7 is used for separating the anode 4 and the cathode 5 from each other, and may be of any suitable known materials routinely used as an insulating porous film of this sort of the non-aqueous electrolyte battery. Specified examples include a high molecular film of polypropylene or polyethylene. The separator 7 is preferably as thin in thickness as possible, from the perspective of the lithium ion conductivity and the energy density. The thickness of the separator is 30 μm or less. By so doing, the lithium ion conductivity between the anode 4 and the cathode 5 of the battery 1 may be optimized to achieve a high energy density.

The exterior material 3 for enclosing the battery device 2 of the above-described structure is a laminate film formed by two or more layers, obtained by bonding e.g. a resin layer and a metal layer by laminating. Specifically, the exterior material 3 is a three-layered laminated film composed of an exterior resin layer, a metal foil layer and a resin sealing layer.

The exterior material 3, used as an outer peripheral layer of the battery 1, is formed of a resin material, such as nylon, polyethylene terephthalate or polyethylene, exhibiting superior strength against breakage or puncturing. These materials are used either alone or layered together in combination. As the metal layer, a metal foil of, for example, aluminum, stainless steel, nickel or iron, is used. Although there is no limitation to the material of the sealing layer, provided that the material used exhibits bonding properties to the anode lead terminal 10 and the cathode lead terminal 14, the material is preferably a resin material, such as non-stretched polypropylene, polyethylene, straight-chained low density polyethylene, high density polyethylene, low density polyethylene, or melted polypropylene, these being used either alone or layered together in combination. In housing the battery device 2 in the exterior material 3, the battery device 2 is placed facing the seal layer.

The battery 1 of the above-described structure is produced as follows: First, the anode 4 is produced. In producing the anode 4, the coating solution of the anode mixture, containing the above-described anode active material and the binder, is prepared, and a gas adsorbing carbon material is added to the coating solution of the anode mixture. The coating solution of the anode mixture, admixed with the gas adsorbing carbon material, is evenly applied to the anode current collector 8 of, for example, a copper foil, so as to form the exposed anode collector portions 11 which exposes the anode current collector 8 to outside. The resulting product is dried in situ and compressed to form the anode mixture layer 9. The resulting product is sliced to a preset size. The anode lead terminal 10 then is connected to the exposed anode collector portions 11, where the anode current collector 8 is exposed, by for example ultrasonic welding or spot welding. This completes the strip-shaped anode 4.

The cathode 5 then is prepared. In producing the cathode 5, the coating solution of the cathode mixture containing the above-described cathode active material, the electrically conductive material and the binder is prepared, and the coating solution of the cathode mixture is evenly applied to the cathode current collector 12 of, for example, an aluminum foil, so as to form the exposed cathode collector portions 15, where the cathode current collector 12 is exposed. The resulting product is dried in situ and pressurized to form the cathode mixture layer 13 in a compressed form. The resulting product is cut to a preset size. The cathode lead terminal 14 is then connected to the exposed cathode collector portions 15, where the cathode current collector 12 is exposed, by for example ultrasonic welding or spot welding. This completes the strip-shaped cathode 5. The gas adsorbing carbon material may be added, in addition to the cathode active material and the electrically conductive material, to the cathode mixture layer 13 of the so produced cathode 5. If carbon black having superior electrical conductivity is used as the gas adsorbing carbon material, the gas adsorbing carbon material may be added as the electrically conductive material to the cathode mixture layer 13.

A solid electrolyte 6 then is formed, as a layer, on each of the major surface of the anode mixture layer 9 of the anode 4 and the major surface of the cathode mixture layer 13 of the cathode 5. In forming the solid electrolyte 6, the electrolyte salt is dissolved in a non-aqueous solvent to prepare a non-aqueous electrolyte solution. This non-aqueous electrolyte solution, a polymer material or a matrix molecular material and, if necessary, a non-aqueous solvent as a diluted solvent, are mixed and agitated together to prepare an electrolytic solution in a sol form. This electrolytic solution is applied to the major surface of the anode mixture layer 9 of the anode 4 and to the major surface of the cathode mixture layer 13 of the cathode 5. The solvent for dilution then is vaporized off to form the solid electrolyte 6 composed of the high molecular solid electrolyte or the gel electrolyte. This forms the solid electrolyte 6 as electrolyte layers on both the cathode 5 and the anode 4.

The anode 4 and the cathode 5, having the solid electrolyte 6 formed on the major surfaces thereof, are coiled together a number of times along the longitudinal direction of the electrodes, with interposition of the separator 7, into a flat shape, so that the solid electrolyte layers face each other, to form the battery device 2. The anode lead terminal 10 and the cathode lead terminal 14 are protruded from one end face along the axial winding direction of the battery device 2.

As the anode lead terminal 11 and the cathode lead terminal 14, provided to the battery device 2, were led out, the battery device 2 was housed within the inside of the exterior material 3. At this time, the battery device 2 was housed within the inside of the exterior material 3 as a resin piece 16 of e.g. propylene, exhibiting bonding properties to the exterior material 3, was applied between the anode lead terminal 11 and the cathode lead terminal 14 on one hand and the exterior material 3 on the other hand. This prohibits shorting in the battery 1 between the anode lead terminal 11 and the cathode lead terminal 14 on one hand and the metal layer of the exterior material 3 on the other hand or the lowering of air tightness within the battery 1.

The resin layers were then bonded together, such as by heat sealing, along the rim of the exterior material 3, in which is housed the battery device 2. This completes the battery 1 in which the anode mixture layer 9 and/or the cathode mixture layer 13 is admixed with the gas adsorbing carbon material.

With the battery 1, produced as described above, the gas adsorbing carbon material, admixed to the anode mixture layer 9 and/or the cathode mixture layer 13, adsorbs the gas evolved within the battery to prohibit the gas from being accumulated within the battery.

Thus, with the battery 1, in which the gas evolved within the battery is adsorbed by the gas adsorbing carbon material, it is possible to prevent such inconvenience that e.g. the non-aqueous electrolyte is decomposed by heating such as when e.g. the electronic equipment is left in a car, etc., during summer and caused to be in a heated state, with e.g. the carbonic gas evolved then causing the exterior material to be expanded like a balloon. It should be noted that, with the present battery 1, outstanding results may be obtained by adding the gas adsorbing carbon material to both the anode mixture layer 9 and the cathode mixture layer 13.

In the above-described embodiment of the battery 1, the gas adsorbing carbon material is added to the anode mixture layer 9 and/or the cathode mixture layer 13. However, such addition of the gas adsorbing carbon material to the anode mixture layer 9 and/or the cathode mixture layer 13 is merely illustrative and the operation and effect of the gas adsorbing carbon material described above may be accomplished by employing an electrode including a gas adsorbing carbon layer 22, containing the gas adsorbing carbon material, formed on an exposed anode current collector portion 21, as in an anode 20 shown in FIG. 5.

Figure 5:
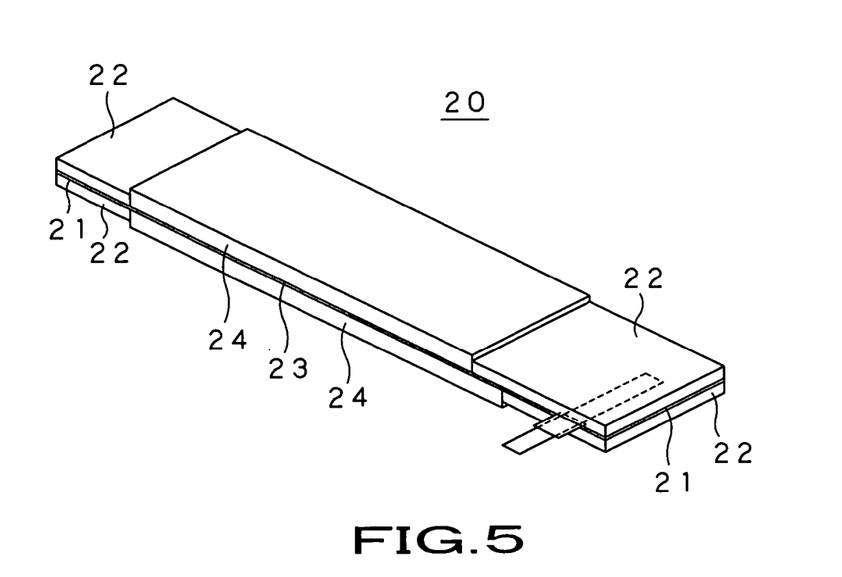
FIG. 5 is a perspective view showing another illustrative structure of an anode provided to the lithium ion secondary battery.

In producing the anode 20, an anode mixture layer 24 is formed on an anode current collector 23, in such a manner that the exposed anode current collector portion 21 exposing the anode current collector 23, is formed on the anode current collector 23, in the same way as in producing the anode 4, as described above. Then, a coating solution of the gas adsorbing carbon material, containing the aforementioned gas adsorbing carbon material and the binder, is produced and evenly coated on the exposed anode current collector portion 21, and the resulting product is dried in situ and pressurized to form the gas adsorbing carbon layer 22 in a compressed form. This completes the anode 20 including the gas adsorbing carbon layer 22.

In place of providing the gas adsorbing carbon layer 22 on the exposed anode current collector portion 21, a carbon tape composed of a substrate containing the aforementioned gas adsorbing carbon material and an adhesive layer provided on one major surface of the substrate may be affixed to the exposed anode current collector portion 21, with the carbon tape then operating as the gas adsorbing carbon layer 22.

In this anode 20, the gas evolved in the battery is adsorbed onto the gas adsorbing carbon material contained in the gas adsorbing carbon layer 22 provided to the exposed anode current collector portion 21, thereby suppresses gas storage within the battery.

In addition, in this anode 20, in which the gas adsorbing carbon material is not contained in the anode mixture layer 24, the proportion of the content of the anode active material in the anode mixture layer 24 is not decreased, thus achieving a large battery capacity.

In the above-described embodiment, the gas adsorbing carbon layer 22 is provided to the exposed anode current collector portion 21 of the anode 20. However, this is merely illustrative and the operation and effect may be accomplished by providing the gas adsorbing carbon layer 22 to the exposed cathode collector portions 15 of the cathode 5.

Moreover, the above-described embodiment is directed to an electrode provided with the gas adsorbing carbon material and the battery 1 employing such electrode. However, the gas adsorbing carbon material need not necessarily be provided to the electrode. For example, a gas adsorbing carbon layer 33 containing a gas adsorbing carbon material may be provided to an inner surface 32a facing a battery device 31 of an exterior material 32 housing the battery device 31 for accomplishing the operation and effect similar to those of the above-described gas adsorbing carbon material, as in the battery 30 shown in FIG. 6.

Figure 6:
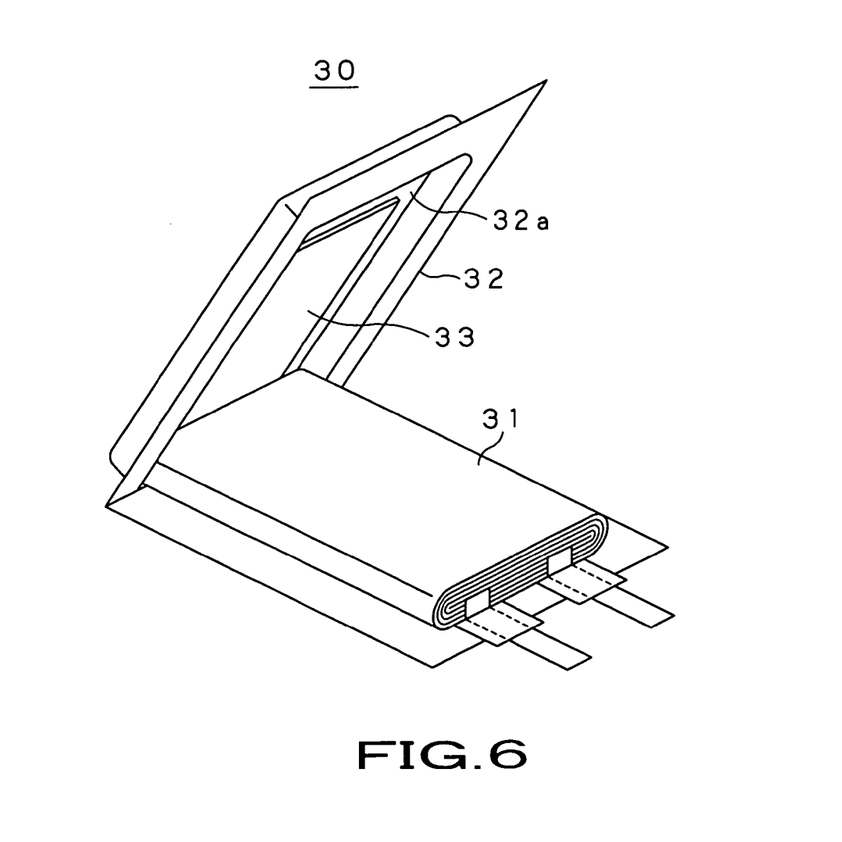
FIG. 6 is an exploded perspective view showing another illustrative structure of the lithium ion secondary battery.

In this case, the battery 30 is produced by sealing the battery device 31 in the exterior material 32 after forming the gas adsorbing carbon layer 33 by applying a coating solution of the gas adsorbing carbon material containing the gas adsorbing carbon material and the binder to the inner surface 32a of the exterior material 32 and by drying the resulting product in situ. Meanwhile, the gas adsorbing carbon layer 33 may be provided to the entire surface or to only a portion of the inner surface 32a facing the battery device 31. In place of providing the gas adsorbing carbon layer 33 to the inner surface 32a of the exterior material 32, the aforementioned carbon tape may be affixed to the inner surface 32a of the exterior material 32, thereby causing the carbon tape to act as the gas adsorbing carbon layer 33.

In the present battery 30, the gas adsorbing carbon material contained in the gas adsorbing carbon layer 33 provided to the inner surface 32a of the exterior material 32 adsorbs the gas evolved in the battery to suppress gas storage in the battery. Thus, in the present battery 30, in which the gas evolved in the battery is adsorbed by the gas adsorbing carbon material, it is possible to prevent such inconvenience that the exterior material is expanded like a balloon by the gas stored in the conventional battery.

In the battery 30, in which no gas adsorbing carbon material is contained in the electrode mixture layer, there is no risk of the proportion of the content of the active material in the mixture layer being lowered, thus it is possible to achieve a large battery capacity.

In the above-described battery 30, the gas adsorbing carbon layer 33 is provided to the inner surface 32a of the exterior material 32. This, however, is merely illustrative and the similar operation and effect may be accomplished by providing the gas adsorbing carbon layer 33 to the outer peripheral surface or the coiled end face of the battery device 2.

Moreover, in the above-described embodiment, the solid electrolyte 6 composed of the high molecular solid electrolyte or the gel electrolyte is used as the non-aqueous electrolyte. This, however, is merely illustrative and the similar operation and effect may be accomplished by employing the non-aqueous liquid electrolyte obtained on dissolving the electrolyte salt in a non-aqueous solvent. Although the above-described embodiment is directed to the battery 1 employing e.g. a laminate film as the exterior material 3, or a so-called polymer battery, this is merely illustrative and the present invention may be applied to a non-aqueous electrolyte battery of variable size and shape, such as a battery employing a metal vessel as its exterior material, such as coin-, square- or button-shaped vessel.

Examples

In the following, a number of samples, actually preparing polymer batteries as the non-aqueous batteries employing the present invention, are explained.

<Sample 1>

In the sample 1, graphite, as an anode active material, was prepared. In preparing the graphite, 30 parts by weight of coal tar based pitch, as a binder, were added to 100 parts by weight of coal based coke as a filler. The resulting mixture was heated to approximately 100° C. and mixed together. The resulting product was compressed by a press to form a precursor of the carbonaceous material. An impregnating step of impregnating a molded product of the carbonaceous material, obtained on heating this precursor at 1000° C. or lower, with a binder pitch obtained on melting at 200° C. or lower, and a heating step of heating the molded product of the carbonaceous material impregnated with the binder pitch at 1000° C. or lower, were repeated a predetermined number of times. The molded product of the carbonaceous material, subjected to a repetition of the impregnating step and the heating step, was heated at 2800° C. in an inert gas atmosphere to produce a graphite molded product, which then was pulverized and classified. In this manner, the powdered graphite was prepared.

The produced graphite was subjected to X-ray diffractometry, by which it was found that the spacing of the (002) plane was 0.337 nm and the C-axis crystal thickness of the (002) plane was 50 nm. The true density by the picnometric method was 2.23 g/cm$^3$ and the specific surface by the BET method was 1.6 m$^2$/g. As for the particle size distribution by the laser diffraction method, the mean particle size was 33 μm, the cumulative 10% particle size was 13.3 μm, the cumulative 50% particle size was 30.6 μm, the cumulative 90% particle size was 55.7 μm, the destructive strength of the particle was 7.1 kgf/mm$^2$ and the bulk density was 0.98 g/cm$^3$.

The anode was then prepared. For producing the anode, 89.5 parts by weight of the powdered graphite, as an anode active material, 0.5 part by weight of acetylene black, having a specific surface as measured by the BET method of 30 m$^2$/g, manufactured by DENKI KAGAKU KOGYO KK, as a gas adsorbing carbon material, 10 parts by weight of polyvinylidene fluoride (PVdF) as a binder, and N-methyl-2-pyrrolidone (NMP) as a solvent, were mixed and kneaded together by a planetary mixer, for dispersion, in order to prepare a coating solution of the anode mixture. Using a die coater as a coating apparatus, the coating solution of the anode mixture was coated uniformly on each surface of a strip-shaped copper foil, 10 μm thick, as an anode current collector such as to form an exposed anode current collector portion. The resulting product was dried for 24 hours at 120° C. under reduced pressure and molded under compression in a roll press to form a layer of the anode mixture, which then was cut to a predetermined size. An anode lead terminal of nickel then was connected to the exposed anode collector portions by resistance welding. This completes an elongated anode.

LiCoO$_2$, as a cathode active material, then was synthesized. In synthesizing LiCoO$_2$, lithium carbonate and cobalt carbonate were mixed at a rate of 0.5 mol to 1 mol and fired at 900° C. for five hours in air atmosphere. LiCoO$_2$ could be synthesized in this manner. The resulting LiCoO$_2$, thus produced, was pulverized and classified to yield powdered LiCoO$_2$ having an average particle size of the order of 15 μm. At this time, the X-ray diffractometry of the so produced LiCoO$_2$ was conducted to verify the coincidence of the diffraction peak of the produced LiCoO$_2$ with that of LiCoO$_2$ registered in the JCPDS (Joint Committee of Powder Diffraction Standard).

A cathode was then prepared. In producing the cathode, 95 parts by weight of powdered LiCoO$_2$, as a cathode active material, 2 parts by weight of KETJENBLACK™, manufactured by LION CORPORATION, as an electrically conductive material, 3 parts by weight of PVdF as a binder, and NMP as a solvent, were mixed and kneaded together by a planetary mixer, for dispersion, in order to prepare a coating solution of the cathode mixture. Using a die coater as a coating apparatus, the coating solution of the cathode mixture was coated uniformly on each surface of a strip-shaped aluminum foil, 20 μm thick, as a cathode current collector. The resulting product was dried in situ for 24 hours at 100° C. under reduced pressure and molded under compression in a roll press to form a layer of the cathode mixture, which then was cut to a predetermined size. A cathode lead terminal of aluminum then was connected to the exposed cathode collector portions by ultrasonic welding. This completes an elongated cathode.

A gel electrolyte was then formed as an electrolyte layer on each major surface of the anode and the cathode, prepared as described above. In forming the electrolyte layer, formed of a gel electrolyte, a non-aqueous solvent was prepared by dissolving LiPF$_6$ in a non-aqueous electrolytic solution, obtained on mixing 55 parts by weight of ethylene carbonate (EC) and 45 parts by weight of propylene carbonate (PC), at a rate of 0.8 mol/kg. 40 parts by weight of this non-aqueous electrolytic solution, 40 parts by weight of a high molecular matrix, obtained on mixing a first high molecular material, with a weight average molecular weight of 700,000, obtained on copolymerizing PVdF and 7 wt % of hexafluoropropylene, and a second high molecular material, with a weight average molecular weight of 300,000, at a weight ratio of 9:1, and 80 parts by weight of dimethyl carbonate, were mixed together and agitated to form a solution of the gel electrolyte in a sol state.

This solution of the gel electrolyte was then coated on both major surfaces of the anode mixture layer and the cathode mixture layer, for impregnation in the anode mixture layer and the cathode mixture layer. Then, dimethyl carbonate was vaporized off at 70° C. This has formed an electrolyte layer of the gel electrolyte on each major surface of the anode mixture layer and the cathode mixture layer.

The anode and the cathode, on the major surfaces of which were formed the electrolyte layers, as described above, were bonded together, via a separator of 15 μm of a micro-porous polypropylene film, so that the gel electrolytes face each other. The resulting product was coiled into a flattened configuration along the longitudinal direction to form a battery device. At this time, the anode lead terminal and the cathode lead terminal were caused to be protruded from one end face of the coiled battery device.

This battery device was then housed within the exterior material of a three-layer laminate film comprising a nylon layer 30 μm in thickness, an aluminum layer 40 μm in thickness and a non-stretched polypropylene (CPP) layer 30 μm in thickness, so that the battery device and the CPP layer face each other. At this time, the battery device was housed within the exterior material as the anode lead terminal and the cathode lead terminal were led out and as a propylene resin piece exhibiting bonding properties was applied to a space between the anode lead terminal and the cathode lead terminal led outwards and the exterior material.

The rim of the exterior material, housing the battery device therein, was bonded so that the CPP layers face each other, and the CPP layers of the bonded portions were heat-sealed at 200° C. to encapsulate the battery device within the exterior material. This completes the polymer battery, in which the gas adsorbing carbon material is added in an amount of 0.5 wt % to only the anode mixture layer.

<Sample 2>

In the sample 2, an anode was prepared in the same way as in the sample 1, except that acetylene black, with the specific surface equal to 70 m$^2$/g as measured by the BET method, manufactured by DENKI KAGAKU KOGYO KK, was used as a gas adsorbing carbon material. A polymer battery was prepared in the same way as the sample 1, except this anode was used in this sample 2.

<Sample 3>

In the sample 3, an anode was prepared in the same way as in the sample 1, except that acetylene black, with the specific surface as measured by the BET method of 130 m$^2$/g, manufactured by DENKI KAGAKU KOGYO KK, was used as a gas adsorbing carbon material. A polymer battery was prepared in the same way as the sample 1, except that this anode was used in this sample 3.

<Sample 4>

In the sample 4, an anode was prepared in the same way as in the sample 1, except that KETJENBLACK™, with the specific surface as measured by the BET method equal to 800 m$^2$/g, manufactured by LION CORPORATION, was used as a gas adsorbing carbon material. A polymer battery was prepared in the same way as the sample 1, except that this anode was used in this sample 4.

<Sample 5>

In the sample 5, an anode was prepared in the same way as in the sample 1 except that activated carbon, with the specific surface equal to 800 m$^2$/g, as measured by the BET method, manufactured by KANTO KAGAKU KK, was used as a gas adsorbing carbon material. A polymer battery was prepared in the same way as the sample 1, except that this anode was used in this sample 5.

<Sample 6>

In the sample 6, an anode was prepared in the same way as in the sample 3, except that acetylene black was added at 0.1 wt % of the total weight of the entire anode mixture layer, as a gas adsorbing carbon material. A polymer battery was prepared in the same way as the sample 1, except that this anode was used in this sample 6.

<Sample 7>

In the sample 7, an anode was prepared in the same way as in the sample 3, except that acetylene black was added at 0.3 wt % of the total weight of the entire anode mixture layer, as a gas adsorbing carbon material. A polymer battery was prepared in the same way as the sample 1, except that this anode was used in this sample 7.

<Sample 8>

In the sample 8, an anode was prepared in the same way as in the sample 3, except that acetylene black was added at 1 wt % of the total weight of the entire anode mixture layer, as a gas adsorbing carbon material. A polymer battery was prepared in the same way as the sample 1, except that this anode was used in this sample 8.

<Sample 9>

In the sample 9, an anode was prepared in the same way as in the sample 3, except that acetylene black was added at 3 wt % of the total weight of the entire anode mixture layer, as a gas adsorbing carbon material. A polymer battery was prepared in the same way as the sample 1, except that this anode was used in this sample 9.

<Sample 10>

In the sample 10, an anode was prepared in the same way as in the sample 3, except that acetylene black was added at 5 wt % of the total weight of the entire anode mixture layer, as a gas adsorbing carbon material. A polymer battery was prepared in the same way as the sample 1, except that this anode was used in this sample 10.

<Sample 11>

In the sample 11, an anode was prepared in the same way as in the sample 3, except that acetylene black was added at 6 wt % of the total weight of the entire anode mixture layer, as a gas adsorbing carbon material. A polymer battery was prepared in the same way as the sample 1, except that this anode was used in this sample 11.

<Sample 12>

In the sample 12, an anode was prepared in the same way as in the sample 1, except that the gas adsorbing carbon material was not added to the anode mixture layer. A polymer battery was prepared in the same way as the sample 1, except that this anode was used in this sample 12.

<Sample 13>

In the sample 13, an anode was prepared in the same way as in the sample 1, except that acetylene black, with the specific surface as measured by the BET method equal to 15 $m^2/g$, manufactured by DENKI KAGAKU KOGYO KK, was added as a gas adsorbing carbon material. A polymer battery was prepared in the same way as the sample 1, except that this anode was used in this sample 13.

<Sample 14>

In the sample 14, an anode was prepared in the same way as in the sample 3, except that acetylene black was added at 0.05 wt % of the total weight of the entire anode mixture layer, as a gas adsorbing carbon material. A polymer battery was prepared in the same way as the sample 1, except that this anode was used in this sample 14.

<Sample 15>

In the sample 15, an anode was prepared in the same way as in the sample 3, except that acetylene black was added at 9 wt % of the total weight of the entire anode mixture layer, as a gas adsorbing carbon material. A polymer battery was prepared in the same way as the sample 1, except that this anode was used in this sample 15.

The polymer batteries of the samples 1 to 15, prepared as described above, were subjected to charging/discharging, as now explained. After subjecting each sample to constant current constant voltage charging for ten hours, in a 23° C. atmosphere, with the charging current of 0.2 C and the upper limit voltage of 4.2V, constant current discharging was carried out up to 3V in the 23° C. atmosphere, with the discharging current of 0.2 C. Meanwhile, the current of 1 C means the current value capable of discharging the rated capacity of the polymer battery in one hour, while the current of 0.2 C means the current value capable of discharging the rated capacity of the polymer battery in five hours.

Of the polymer batteries of the samples 1 to 15, manufactured as described above, measurements were made of the charging/discharging efficiency, the amount of swell on storage at elevated temperatures and the battery temperature at the time of over-charging.

The following Table 1 shows the results of evaluation of the charging/discharging efficiency, the amount of swell on storage at elevated temperatures and the battery temperature at the time of over-charging of the respective samples.

TABLE 1

| | gas absorbing carbon material added to anode mixture layer | | | | | |
|---|---|---|---|---|---|---|
| | type | specific surface ($m^2/g$) | amount of addition (wt %) | charging/discharging efficiency (%) | swell due to high temperature storage (%) | battery temperature in over-charging (° C.) |
| sample 1 | acetylene black | 30 | 0.5 | 78 | 180 | 90 |
| sample 2 | acetylene black | 70 | 0.5 | 77 | 166 | 89 |
| sample 3 | acetylene black | 130 | 0.5 | 78 | 141 | 90 |
| sample 4 | KETJENBLACK ™ | 800 | 0.5 | 77 | 120 | 88 |
| sample 5 | activated carbon | 800 | 0.5 | 77 | 120 | 90 |
| sample 6 | acetylene black | 130 | 0.1 | 79 | 180 | 90 |
| sample 7 | acetylene black | 130 | 0.3 | 78 | 127 | 89 |
| sample 8 | acetylene black | 130 | 1 | 77 | 118 | 91 |
| sample 9 | acetylene black | 130 | 3 | 77 | 116 | 89 |
| sample 10 | acetylene black | 130 | 5 | 76 | 114 | 89 |
| sample 11 | acetylene black | 130 | 6 | 74 | 112 | 88 |
| sample 12 | — | — | — | 78 | 316 | 70 |
| sample 13 | acetylene black | 15 | 0.5 | 78 | 190 | 88 |
| sample 14 | acetylene black | 130 | 0.05 | 78 | 230 | 89 |
| sample 15 | acetylene black | 130 | 9 | 68 | 110 | 89 |

The charging/discharging efficiency in Table 1 denotes the ratio of the discharging capacity to the charging capacity when the operation is carried out under the above-described charging/discharging conditions. The amount of swell due to high temperature storage in Table 1 was measured as follows: The respective samples were charged under the charging conditions described above, and measurement was made of the thicknesses thereof. The samples were stored for ten days in a high temperature vessel with the temperature within the vessel being 80° C. Following the storage, the thicknesses of the respective samples were measured within three minutes as from the time the samples were taken out of the high temperature vessel. The values of the swell caused by high temperature storage in Table 1 represent the ratio of the battery thickness after storage to the battery thickness prior to storage, as measured in the manner described above. The battery temperature during over-charging in Table 1 was measured as follows: After the respective samples were charged to 4.2 V under the above charging conditions, the constant current constant voltage charging in a 23° C. atmosphere, with the charging current of 1 C and the upper limit voltage of 10V, was carried out for 24 hours, and measurement was made of the temperature of the outer peripheral surface of the battery during charging. The values of the battery temperature at the time of over-charging in Table 1 represent the maximum temperature on the outer peripheral surface as measured in the manner described above.

From the results of the evaluation, shown in Table 1, it may be seen that the amount of swell on storage at elevated temperatures is appreciably decreased with the samples 1 to 11 where the gas adsorbing carbon material is mixed into the anode mixture layer as compared to the sample 12 where no gas adsorbing carbon material is mixed into the anode mixture layer.

In the sample 12, where there is no gas adsorbing carbon material in the battery such that the gas evolved in the battery on heating is not adsorbed, the gas evolved in the battery is accumulated to cause the exterior material formed by the laminated film to be expanded like a balloon to increase the battery thickness to a large extent.

From the results of the evaluation shown in Table 1, it may also be seen that, with the samples 1 to 11 in which the gas adsorbing carbon material with the specific surface not less than 30 m$^2$/g is added to the anode mixture layer, the amount of swell on storage at elevated temperatures is lower than in the sample 13 where the gas adsorbing carbon material with the specific surface of 15 m$^2$/g is added to the anode mixture layer.

With the sample 13, in which the specific surface of the gas adsorbing carbon material is 15 m$^2$/g, such that the gas adsorbing surface of the gas evolved in the battery on heating is small, the amount of the gas evolved in the battery which is adsorbed by the gas adsorbing carbon material is small. Thus, with the sample 13, the amount of the gas stored in the battery is increased to increase the battery thickness.

From the results of the evaluation shown in Table 1, it can also be seen that, with the samples 1 to 11 in which the amount of addition of the gas adsorbing carbon material to the entire anode mixture layer is not less than 0.1 wt % and not larger than 6 wt %, the amount of swell due to storage at elevated temperatures is appreciably smaller than with the sample 14 in which the amount of addition of the gas adsorbing carbon material to the entire anode mixture layer is 0.05 wt %. It may also be seen that, with the samples 1 to 11, the charging/discharging efficiency is appreciably larger than with the sample 15 in which the amount of addition of the gas adsorbing carbon material to the entire anode mixture layer is 9 wt %.

In the sample 14, in which the amount of addition of the gas adsorbing carbon material to the weight of the entire anode mixture layer is 0.05 wt %, such that the amount of the gas adsorbing carbon material added to the anode mixture layer is small, the amount of the gas evolved in the battery on heating which is adsorbed to the gas adsorbing carbon material is also small. Thus, with the sample 14, the amount of the gas stored in the battery is larger to increase the battery thickness.

In the sample 15, the amount of addition of the gas adsorbing carbon material to the entire anode mixture layer is 9 wt %, such that the amount of the gas adsorbing carbon material added to the anode mixture layer is large. Thus, the excess portion of the gas adsorbing carbon material decomposes the gel electrolyte to decrease the battery capacity.

With the samples 1 to 11, as contrasted to the above samples 12 to 15, the gas adsorbing carbon material, with the specific surface being not less than 30 m$^2$/g, is added in an amount not less than 0.1 wt % and not larger than 6 wt % of the total weight of the anode mixture layer. Thus, with the samples 1 to 11, the gas adsorbing carbon material, with the specific surface not less than 30 m$^2$/g, added in a suitable amount to the anode mixture layer, adsorbs the gas in the battery to prohibit the gas from being accumulated in the battery, while suppressing the decomposition of the gel electrolyte by the gas adsorbing carbon material to suppress the lowering of the battery capacity.

It may be seen from above that addition of the gas adsorbing carbon material with the specific surface not less than 30 m$^2$/g in an amount not less than 0.1 wt % and not larger than 6 wt % of the total weight of the anode mixture layer is highly effective in manufacturing a polymer battery in which the amount of swell on storage at elevated temperatures is suppressed and the charging/discharging efficiency is higher.

The samples 16 to 22, in which the site of addition of the gas adsorbing material is different from that in the above samples 1 to 15, are now explained.

<Sample 16>

In the sample 16, a cathode in which the gas adsorbing carbon material had been added at 0.2 wt % of the total weight of the entire cathode mixture layer was prepared in the same way as in sample 1, except preparing a coating solution of the cathode mixture by mixing 96.8 parts by weight of LiCoO$_2$, 0.2 part by weight of KETJENBLACK™ with the specific surface of 800 m$^2$/g as measured by the BET method, manufactured by LION CORPORATION, as a gas adsorbing carbon material/electrically conductive material, 3 parts by weight of PVdF as a binder, and NMP as a solvent, subjecting the resulting mixture to dispersion and employing the so produced coating solution. A polymer battery, in which the gas adsorbing carbon material had been added only to the cathode mixture layer, was prepared in the same way as the sample 12 except that this cathode was employed in this sample 16.

<Sample 17>

In the sample 17, a cathode was prepared in the same way as in the sample 16, except that KETJENBLACK™ was added as a gas adsorbing carbon material at 0.5 wt % of the total weight of the entire cathode mixture layer. A polymer battery was prepared in the same way as in the sample 16, except that this cathode was employed in this sample 17.

<Sample 18>

In the sample 18, a cathode was prepared in the same way as in the sample 16, except that KETJENBLACK™ was added as a gas adsorbing carbon material at 1 wt % of the total weight of the entire cathode mixture layer. A polymer battery was prepared in the same way as in the sample 16, except that this cathode was employed in this sample 18.

<Sample 19>

In the sample 19, a cathode was prepared in the same way as in the sample 16, except that KETJENBLACK™ was added as a gas adsorbing carbon material at 3.5 wt % of the total weight of the entire cathode mixture layer. A polymer battery was prepared in the same way as in the sample 16, except that this cathode was employed in this sample 19.

<Sample 20>

In the sample 20, a cathode was prepared in the same way as in the sample 16, except adding neither an electrically conductive material nor a gas adsorbing carbon material to the cathode mixture layer. A polymer battery was prepared in the same way as in the sample 16, except that this cathode was employed in this sample 20.

<Sample 21>

In the sample 21, a cathode was prepared in the same way as in the sample 16, except that KETJENBLACK™ was added as a gas adsorbing carbon material at 0.1 wt % of the total weight of the entire cathode mixture layer. A polymer battery was prepared in the same way as in the sample 16 except that this cathode was used in this sample 21.

<Sample 22>

In the sample 22, a cathode was prepared in the same way as in the sample 16, except that KETJENBLACK™ was added as a gas adsorbing carbon material at 4 wt % of the total weight of the entire cathode mixture layer. A polymer battery was prepared in the same way as in the sample 16, except that this cathode was employed in this sample 22.

Of the polymer batteries of the samples 16 to 22, prepared as described above, the charging/discharging efficiency, an amount of swell caused by storage at elevated temperatures, and the battery temperatures in over-charging, were measured.

The following Table 2 shows the results of evaluation of the charging/discharging efficiency, the amount of swell on storage at elevated temperatures and the battery temperature at the time of over-charging of the samples 16 to 22.

TABLE 2

| | gas absorbing carbon material added to cathode mixture layer | | | | amount of swell due | battery |
|---|---|---|---|---|---|---|
| | type | specific surface ($m^2/g$) | amount of addition (wt %) | charging/discharging efficiency (%) | to storage at elevated temperatures (%) | temperature in over-charging (° C.) |
| sample 16 | KETJENBLACK ™ | 800 | 0.2 | 78 | 182 | 80 |
| sample 17 | KETJENBLACK ™ | 800 | 0.5 | 77 | 167 | 84 |
| sample 18 | KETJENBLACK ™ | 800 | 1 | 78 | 152 | 87 |
| sample 19 | KETJENBLACK ™ | 800 | 3.5 | 77 | 141 | 90 |
| sample 20 | — | — | — | 40 | 450 | 70 |
| sample 21 | KETJENBLACK ™ | 800 | 0.1 | 77 | 195 | 77 |
| sample 22 | KETJENBLACK ™ | 800 | 4 | 80 | 150 | ≥200 |

In the samples 16 to 22, the charging/discharging efficiency, the amount of swell on storage under elevated temperatures and the battery temperature in over-charging were measured in the same way as in the samples 1 to 15 described above.

From the results of evaluation shown in Table 2, the charging/discharging capacity is appreciably larger and the amount of swell on storage under elevated temperatures is appreciably smaller in the samples 16 to 19 where KETJENBLACK™ is added in an amount not less than 0.2 wt % and not larger than 3.5 wt % than in the sample 20 where no KETJENBLACK™ as an electrically conductive material/gas adsorbing carbon material is added.

In the sample 20, in which KETJENBLACK™ as an electrically conductive material/gas adsorbing carbon material is not added to the cathode mixture layer, the cathode mixture layer is deteriorated in electrical conductivity, thus lowering the battery characteristics. Moreover, in the sample 20, in which no gas adsorbing carbon material is added to the cathode mixture layer, a gas is evolved due to heating and stored in the battery, thus increasing the battery thickness to a large extent.

From the results of evaluation shown in Table 2, the amount of swell caused by storage under elevated temperatures is smaller in the samples 16 to 19 than in the sample 21 where 0.1 wt % of KETJENBLACK™ is added to the cathode mixture layer.

In the sample 21, where the amount of addition of KETJENBLACK™ as an electrically conductive material/gas adsorbing carbon material is 0.1 wt % of the total weight of the cathode mixture layer, such that the amount of KETJENBLACK™ added to the cathode mixture layer is small, the amount of the gas evolved on heating in the battery which is adsorbed to KETJENBLACK™ is also small. Thus, in the sample 21, the amount of the gas stored in the battery is large to increase the battery thickness.

From the results of evaluation shown in Table 2, it is also seen that the battery temperature at the time of over-charging is lowered appreciably in the samples 16 to 19 as compared to that of the sample 22 in which 4 wt % of KETJENBLACK™ is added to the cathode mixture layer.

In the sample 22, in which the amount of addition of KETJENBLACK™ as an electrically conductive material/gas adsorbing carbon material is 4 wt % of the total weight of the cathode mixture layer, such that the amount of highly electrically conductive KETJENBLACK™ added to the cathode mixture layer is excessively large, the electrical conductivity of the cathode mixture layer is increased excessively due to the excess amount of KETJENBLACK™. The result is that the battery temperature is raised in case the battery is in the excessively charged state to render it difficult to maintain the battery safety.

In these samples 16 to 19, in contradistinction from the samples 20 to 22, the amount of addition of KETJENBLACK™ as an electrically conductive material/gas adsorbing carbon material is moderate, being not less than 0.2 wt % and not larger than 3.5 wt %, so that it is possible to prevent the gas from being accumulated in the battery to achieve excellent battery characteristics and safety.

It is seen from above that addition of KETJENBLACK™ as an electrically conductive material/gas adsorbing carbon material in an amount not less than 0.2 wt % and not larger than 3.5 wt % of the total weight of the cathode mixture layer is highly effective in manufacturing a polymer battery in which the amount of swell due to storage at elevated temperatures is suppressed and the battery safety in over-charging is raised.

The samples 23 to 29, in which, in addition to the carbonaceous material as the electrically conductive material, activated carbon is admixed as the gas adsorbing carbon material to the cathode active material, is now explained.

<Sample 23>

In the sample 23, a cathode in which a gas adsorbing carbon material was added at 0.2 wt % of the total weight of the entire cathode mixture layer was prepared in the same way as in sample 1, except employing a coating solution of the cathode mixture prepared by mixing and dispersing 94.8 parts by weight of $LiCoO_2$, 2 wt % of KETJENBLACK™ as an electrically conductive material, 0.2 part by weight of activated carbon with the specific surface of 800 $m^2/g$ as measured by the BET method, manufactured by KANTO KAGAKU KK, as a gas adsorbing carbon material, 3 parts by weight of PVdF, as a binder, and NMP as a solvent. A polymer battery, in which the gas adsorbing carbon material is deposited only to the cathode mixture layer, was prepared in the same way as in the sample 12, except that this cathode was used in this sample 23.

<Sample 24>

In the sample 24, a cathode was prepared in the same way as in the sample 23, except that activated carbon was added as a gas adsorbing carbon material, in addition to the electrically conductive material, at 0.5 wt % of the total weight of the entire cathode mixture layer. A polymer battery was prepared in the same way as in sample 23, except that this cathode was used in this sample 24.

<Sample 25>

In the sample 25, a cathode was prepared in the same way as in the sample 23, except that activated carbon was added as a gas adsorbing carbon material, in addition to the electrically conductive material, at 1 wt % of the total weight of the entire cathode mixture layer. A polymer battery was prepared in the same way as in sample 23, except that this cathode was used in this sample 25.

<Sample 26>

In the sample 26, a cathode was prepared in the same way as in the sample 23, except that activated carbon was added as a gas adsorbing carbon material, in addition to the electrically conductive material, at 4 wt % of the total weight of the entire cathode mixture layer. A polymer battery was prepared in the same way as in sample 23, except that this cathode was used in this sample 26.

<Sample 27>

In the sample 27, a cathode was prepared in the same way as in the sample 23, except that activated carbon was added as a gas adsorbing carbon material, in addition to the electrically conductive material, at 8 wt % of the total weight of the entire cathode mixture layer. A polymer battery was prepared in the same way as in sample 23, except that this cathode was used in this sample 27.

<Sample 28>

In the sample 28, a cathode was prepared in the same way as in the sample 23, except that activated carbon was added as a gas adsorbing carbon material, in addition to the electrically conductive material, at 0.1 wt % of the total weight of the entire cathode mixture layer. A polymer battery was prepared in the same way as in sample 23, except that this cathode was used in this sample 28.

<Sample 29>

In the sample 29, a cathode was prepared in the same way as in the sample 23, except that activated carbon was added as a gas adsorbing carbon material, in addition to the electrically conductive material, at 9 wt % of the total weight of the entire cathode mixture layer. A polymer battery was prepared in the same way as in sample 23, except that this cathode was used in this sample 29.

Of the polymer batteries of the samples 23 to 29 prepared as described above, the charging/discharging efficiency, the swell caused due to storage under elevated temperatures and the battery temperature were measured.

The following Table 3 shows the results of evaluation of the charging/discharging efficiency, the amount of swell on storage at elevated temperatures and the battery temperature at the time of over-charging of the samples 23 to 29.

TABLE 3

| | gas absorbing carbon material added besides electrically conductive material to cathode mixture layer | | | | | |
|---|---|---|---|---|---|---|
| | sort | specific surface ($m^2/g$) | amount of addition (wt %) | charging/discharging efficiency (%) | swell due to storage at high temperature (%) | battery temperature in over-charging (° C.) |
| sample 23 | activated carbon | 800 | 0.2 | 78 | 178 | 87 |
| sample 24 | activated carbon | 800 | 0.5 | 78 | 165 | 89 |
| sample 25 | activated carbon | 800 | 1 | 78 | 151 | 90 |
| sample 26 | activated carbon | 800 | 4 | 76 | 141 | 88 |
| sample 27 | activated carbon | 800 | 8 | 74 | 125 | 92 |
| sample 28 | activated carbon | 800 | 0.1 | 78 | 199 | 86 |
| sample 29 | activated carbon | 800 | 9 | 70 | 120 | 93 |

In the samples 23 to 29, the charging/discharging efficiency, the swell caused on storage at elevated temperatures and the battery temperature at the time of over-charging were measured in the same way as in the samples 1 to 15 described above.

From the results of the evaluation shown in Table 3, it is seen that the amount of swell caused on storage under elevated temperatures is appreciably smaller in the samples 23 to 27, where activated carbon as the gas adsorbing carbon material is added in addition to the electrically conductive material in an amount not less than 0.2 wt % and not larger than 8 wt % of the total weight of the entire cathode mixture layer, than in the sample 28 where activated carbon is added in an amount of 0.1 wt % of the total weight of the entire cathode mixture layer in addition to the electrically conductive material. It is also seen that, in the samples 23 to 27, the charging/discharging efficiency is higher than in the sample 29 where 9 wt % of activated carbon is added to the entire cathode mixture layer in addition to the electrically conductive material.

In the sample 28, in which the amount of activated carbon added to the cathode mixture layer as the gas adsorbing carbon material in addition to the electrically conductive material is 0.1 wt %, such that the amount of the gas adsorbing carbon material added to the cathode mixture layer is small, the amount of the gas evolved in the battery on heating and deposited on the gas adsorbing carbon material is also small. Thus, with the sample 28, the amount of the gas stored in the battery is increased to increase the battery thickness.

In the sample 29, in which the amount of activated carbon added to the cathode mixture layer as the gas adsorbing carbon material in addition to the electrically conductive material is 9 wt %, such that the amount of the gas adsorbing carbon material added to the cathode mixture layer is large, the excess gas adsorbing carbon material decomposes the gel electrolyte to lower the battery capacity.

In the samples 23 to 27, in contradistinction from the above samples 28 and 29, the amount of activated carbon added as the gas adsorbing carbon material in addition to the electrically conductive material to the entire cathode mixture layer is not less than 0.2 wt % and not larger than 8 wt %, such that a moderate amount of the activated carbon is added to the cathode mixture layer. Thus, in the samples 23 to 27, the activated carbon, added in a moderate amount to the cathode mixture layer, suitably adsorbs the gas in the battery to suppress the amount of the gas otherwise accumulated in the battery as well as to suppress the decomposition of the gel electrolyte by the gas adsorbing carbon material to prevent the lowering of the battery capacity.

It is seen from above that addition of activated carbon as the gas adsorbing carbon material in an amount less than 0.2 wt % and not larger than 8 wt % to the cathode mixture layer in addition to the electrically conductive material is highly effective in preparing an excellent polymer battery in which the amount of swell caused on storage at elevated temperatures may be suppressed and a superior charging/discharging efficiency may be achieved.

The samples 30 to 39, in which a gas adsorbing carbon layer, containing a gas adsorbing carbon material, is provided to the exposed current collector portions of the electrodes or to the inner surface of the exterior material, in contradistinction from the samples 1 to 29 where the gas adsorbing carbon material is added to the mixture layers of the electrodes, are hereinafter explained.

<Sample 30>

In the sample 30, an anode was prepared in the same way as in the sample 12, described above, except forming the gas adsorbing carbon layer by evenly applying to the exposed anode current collector portion a coating solution of the gas adsorbing carbon material, obtained on mixing and dispersing 50 parts by weight of acetylene black, with the specific surface as measured by the BET method of 130 $m^2/g$, manufactured by DENKI KAGAKU KOGYO KK, 50 parts by weight of PVdF as a binder, and NMP as a solvent, drying the so applied coating solution in situ and molding the dried product under compression. A polymer battery, having a gas adsorbing carbon layer on the anode, was prepared in the same way as in sample 1, except that this anode was used in this sample 30.

<Sample 31>

In the sample 31, an anode was prepared in the same way as in the sample 30, described above, except forming the gas adsorbing carbon layer on the exposed anode current collector portion, using KETJENBLACK™ with the specific surface as measured by the BET method of 800 $m^2/g$, as the gas adsorbing carbon material, manufactured by LION CORPORATION. A polymer battery, having the gas adsorbing carbon layer on the anode, was prepared in the same way as in the sample 1, except that this anode was used in this sample 31.

<Sample 32>

In the sample 32, an anode was prepared in the same way as in the sample 30, described above, except forming the gas adsorbing carbon layer on the exposed anode current collector portion, using activated carbon with the specific surface as measured by the BET method of 800 $m^2/g$, manufactured by KANTO KAGAKU KK, as the gas adsorbing carbon material. A polymer battery, having the gas adsorbing carbon layer on the anode, was prepared in the same way as in the sample 1, except that this anode was used in this sample 32.

<Sample 33>

In the sample 33, an anode was prepared in the same way as in the sample 12, described above, except bonding a carbon tape (T-9180) containing a carbonaceous material with the specific surface as measured by the BET method of 30 $m^2/g$, manufactured by SHINTO PAINT, CO., LTD. as the gas adsorbing carbon material, to the exposed anode current collector portion. A polymer battery, having the carbon tape as the gas adsorbing carbon layer on the anode, was prepared in the same way as in the sample 1, except that this anode was used in this sample 33.

<Sample 34>

In the sample 34, a cathode was prepared in the same way as in the sample 1, described above, except forming the gas adsorbing carbon layer by evenly applying to the exposed cathode current collector portion a coating solution of the gas adsorbing carbon material, obtained on mixing and dispersing 50 parts by weight of acetylene black, with the specific surface as measured by the BET method of 130 $m^2/g$, manufactured by DENKI KAGAKU KOGYO KK, 50 parts by weight of PVdF as a binder, and NMP as a solvent, drying the so applied coating solution in situ and molding the dried product under compression. A polymer battery, having the gas adsorbing carbon layer on the cathode, was prepared in the same way as in the sample 12, except that this cathode was used in this sample 34.

<Sample 35>

In the sample 35, a cathode was prepared in the same way as in the sample 34, described above, except forming the gas adsorbing carbon layer on the exposed cathode current collector portion, using KETJENBLACK™ with the specific surface as measured by the BET method of 800 $m^2/g$, manufactured by LION CORPORATION, as the gas adsorbing carbon material. A polymer battery, having the gas adsorbing carbon layer on the cathode, was prepared in the same way as in the sample 12, except that this anode was used in this sample 35.

<Sample 36>

In the sample 36, a cathode was prepared in the same way as in the sample 34, described above, except forming the gas adsorbing carbon layer on the exposed cathode current collector portion, using activated carbon with the specific surface as measured by the BET method of 800 $m^2/g$, manufactured by KANTO KAGAKU KK, as the gas adsorbing carbon material. A polymer battery, having the gas adsorbing carbon layer on the cathode, was prepared in the same way as in the sample 12, except that this anode was used in this sample 36.

<Sample 37>

In the sample 37, a cathode was prepared in the same way as in the sample 1, described above, except bonding the carbon tape (T-9180), manufactured by SHINTO PAINT, CO., LTD., as the gas adsorbing carbon material, to the exposed cathode current collector portion. A polymer battery, having the carbon tape as the gas adsorbing carbon layer on the cathode, was prepared in the same way as in the sample 12, except that this cathode was used in this sample 37.

<Sample 38>

In producing the electrodes in the sample 38, an anode similar to that of sample 32, including a gas adsorbing carbon layer containing activated carbon with the specific surface of 800 $m^2/g$, manufactured by KANTO KAGAKU KK, on the exposed anode current collector portion, as the gas adsorbing carbon material, was prepared, whilst a cathode similar to that of sample 36, including a gas adsorbing carbon layer containing activated carbon with the specific surface of 800 $m^2/g$, manufactured by KANTO KAGAKU KK, on the exposed cathode current collector portion, as the gas adsorbing carbon material, was prepared. A polymer battery, having the gas adsorbing carbon layer on the anode and the cathode, was prepared in the same way as in the sample 1, except that the so produced electrodes were used in this sample 38.

<Sample 39>

In the sample 39, a polymer battery was prepared in the same way as in the sample 12, except bonding a carbon tape (T-9180) manufactured by SHINTO PAINT CO., LTD., as the gas adsorbing carbon material, to the inner surface of the exterior material facing the battery device.

Of the polymer batteries of the samples 30 to 39, prepared as described above, the charging/discharging efficiency, the swell caused due to storage under elevated temperatures and the battery temperature were measured.

The following Table 4 shows the results of evaluation of the charging/discharging efficiency, the amount of swell on storage at elevated temperatures and the battery temperature at the time of over-charging of the samples 30 to 39 and the sample 12.

TABLE 4

| | gas absorbing carbon layer | | | | |
|---|---|---|---|---|---|
| | sort of gas absorbing carbon layer | mounting position | charging/discharging efficiency (%) | swell on storage at high temperature (%) | battery temperature in over-charging(° C.) |
| sample 30 | acetylene black | exposed anode collector part | 78 | 110 | 91 |
| sample 31 | KETJENBLACK ™ | exposed anode collector part | 79 | 101 | 91 |
| sample 32 | activated carbon | exposed anode collector part | 77 | 101 | 89 |
| sample 33 | carbon tape | exposed anode collector part | 77 | 176 | 90 |
| sample 34 | acetylene black | exposed cathode collector part | 78 | 110 | 89 |
| sample 35 | KETJENBLACK ™ | exposed cathode collector part | 78 | 101 | 90 |
| sample 36 | activated carbon | exposed cathode collector part | 78 | 101 | 88 |
| sample 37 | carbon tape | exposed cathode collector part | 78 | 177 | 89 |
| Sample 38 | activated carbon | exposed anode collector part | 78 | 100 | 90 |
| | activated carbon | exposed cathode collector part | | | |
| sample 39 | carbon tape | inner surface of exterior material | 78 | 185 | 88 |
| sample 12 | — | — | 78 | 316 | 70 |

Meanwhile, in the samples 30 to 39, the charging/discharging efficiency, the amount of swell on storage at a high temperature and the battery temperature in over-charging were measured in the same way as in the samples 1 to 15 described above.

From the results of evaluation, shown in Table 4, it is seen that, in the samples 30 to 39, provided with the gas adsorbing carbon layer, containing the gas adsorbing carbon material, on the electrode(s) or on the inner surface of the exterior surface, the amount of swell due to storage at elevated temperatures is appreciably smaller than in the sample 12 not provided with the gas adsorbing carbon layer in the battery.

It is seen from above that a polymer battery, in which the amount of swell caused on storage at elevated temperatures is suppressed, may also be obtained by providing a gas adsorbing carbon layer containing the gas adsorbing carbon material at a preset location in the battery, without adding the gas adsorbing carbon material to the electrode mixture layer, in preparing the polymer battery.

The present invention is not limited to the embodiments described with reference to the drawings and, as may be apparent to those skilled in the art, various changes, substitutions or equivalents may be envisaged without departing from the spirit and scope of the invention as defined in the appended claims.

The invention claimed is:

1. A non-aqueous electrolyte battery comprising:
an anode having an anode mixture containing an anode active material;
a cathode having a cathode mixture containing a cathode active material;
a separator between the anode and the cathode;
an electrolyte including a polymer material and an electrolyte salt contained therein;
a film-shaped exterior material housing therein the anode, the cathode, the separator and the electrolyte; and
a gas adsorbing carbon layer on an inner surface of the film-shaped exterior material,
wherein,
the anode mixture includes a first gas adsorbing carbon material having a specific surface area not less than 130 m²/g, and
the cathode mixture includes an electrically conductive material and a second gas adsorbing carbon material, in an amount not less than 0.2 wt % and not larger than 8 wt % of the total weight of the cathode mixture.

2. The non-aqueous electrolyte battery according to claim 1, wherein the first gas adsorbing carbon material includes an activated carbon.

3. The non-aqueous electrolyte battery according to claim 1, wherein the first gas adsorbing carbon material is in an amount not less than 0.1 wt % and not larger than 6 wt % of the total weight of the anode mixture.

4. The non-aqueous electrolyte battery according to claim 1, wherein, the second gas adsorbing carbon material is carbon black, and the carbon black is in an amount not less than 0.2 wt % and not larger than 4 wt % of the total weight of the cathode mixture.

5. The non-aqueous electrolyte battery according to claim 1, wherein the film-shaped exterior material further includes a metal layer.

6. The non-aqueous electrolyte battery according to claim 1, wherein the electrolyte is a gel electrolyte including a non-aqueous solvent, contained in the polymer material, in addition to the electrolyte salt.

7. The non-aqueous electrolyte battery according to claim 1, wherein the electrolyte includes an organic high molecular weight material that is poly(vinylidene) fluoride or poly(vinylidene) fluoride-co-hexafluoropropylene.

8. The non-aqueous electrolyte battery according to claim 1, wherein, the electrolyte salt includes $LiPF_6$ or $LiBF_4$.

9. The non-aqueous electrolyte battery according to claim 6, wherein the non-aqueous solvent contains ethylene carbonate.

10. The non-aqueous electrolyte battery according to claim 1, wherein the first gas adsorbing carbon material admixed to the anode mixture layer is effective to adsorb gas.

11. The non-aqueous electrolyte battery according to claim 1, wherein the electrolyte includes an organic high molecular weight material.

12. The non-aqueous electrolyte battery according to claim 1, wherein the anode active material includes graphite.

13. The non-aqueous electrolyte battery according to claim 1 wherein the film-shaped exterior material is a laminate film including an exterior resin layer and a resin sealing layer bonded to a lead terminal.

* * * * *